US009252848B2

(12) United States Patent
Hale et al.

(10) Patent No.: US 9,252,848 B2
(45) Date of Patent: *Feb. 2, 2016

(54) APPARATUS, SYSTEMS AND METHODS FOR PAIRING A CONTROLLED DEVICE WITH AN RF REMOTE CONTROL USING AN RFID TAG

(71) Applicant: EchoStar Technologies L.L.C., Englewood, CO (US)

(72) Inventors: Nathan Hale, Denver, CO (US); David A. Innes, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/012,807

(22) Filed: Aug. 28, 2013

(65) Prior Publication Data

US 2013/0342329 A1  Dec. 26, 2013

Related U.S. Application Data

(63) Continuation of application No. 13/071,773, filed on Mar. 25, 2011, now Pat. No. 8,525,651.

(51) Int. Cl.
| | |
|---|---|
| *H04L 17/02* | (2006.01) |
| *H04B 5/00* | (2006.01) |
| *G08C 17/02* | (2006.01) |
| *H04N 21/422* | (2011.01) |
| *H04N 21/441* | (2011.01) |

(52) U.S. Cl.
CPC .............. *H04B 5/0062* (2013.01); *G08C 17/02* (2013.01); *H04N 21/42204* (2013.01); *H04N 21/441* (2013.01); *G08C 2201/20* (2013.01)

(58) Field of Classification Search
CPC .... G08C 17/00; G08C 17/02; G08C 2201/20; G08C 2201/21; G08C 2201/2201; G08C 2201/61; G08C 2201/94; H04B 1/205
USPC ............... 340/539.1, 539.11, 539.12, 539.14, 340/4.11, 4.12, 4.13, 4.14, 4.2, 4.21, 4.3, 340/4.31, 8.1, 12.22, 12.23, 12.24, 12.51, 340/13.24, 13.25, 13.26
See application file for complete search history.

(56) References Cited

U.S. PATENT DOCUMENTS

| | | | | |
|---|---|---|---|---|
| 5,500,691 | A  * | 3/1996 | Martin et al. | .................. 348/734 |
| 6,791,467 | B1 * | 9/2004 | Ben-Ze'ev | .................. 340/12.25 |
| 7,116,229 | B1 | 10/2006 | Miramontes | |

(Continued)

FOREIGN PATENT DOCUMENTS

WO     2005036325 A2    4/2005

*Primary Examiner* — Nabil Syed
(74) *Attorney, Agent, or Firm* — Lowe Graham Jones PLLC (57) ABSTRACT

Systems and methods are operable to initiate a pairing process and a de-pairing process between a controlled device and a radio frequency (RF) remote control. An exemplary embodiment detects presence of a radio frequency identifier (RFID) tag in an interrogation zone established by an RFID tag reader, automatically initiates a pairing process in response to detecting the presence of the RFID tag in the interrogation zone, and completes the pairing process between the RF remote control and the controlled device, wherein the pairing process identifies a unique identifier associated with the RF remote control. A subsequently received RF signal emitted by the RF remote control includes at least one command configured to control operation of the controlled device and includes the unique identifier.

13 Claims, 3 Drawing Sheets

(56) References Cited

U.S. PATENT DOCUMENTS

| | | | |
|---|---|---|---|
| 7,319,394 B2 | 1/2008 | Sheller | |
| 7,363,028 B2 | 4/2008 | de Clerq et al. | |
| 7,647,610 B2* | 1/2010 | Kim | 725/46 |
| 7,719,438 B2 | 5/2010 | Hardacker et al. | |
| 7,839,298 B2 | 11/2010 | Hardacker et al. | |
| 2004/0070491 A1 | 4/2004 | Huang et al. | |
| 2006/0116667 A1 | 6/2006 | Hamel et al. | |
| 2006/0190538 A1 | 8/2006 | Hwang et al. | |
| 2006/0197676 A1 | 9/2006 | Smith | |
| 2008/0094245 A1 | 4/2008 | Hardacker et al. | |
| 2008/0253772 A1* | 10/2008 | Katsuyama | 398/106 |
| 2009/0121865 A1 | 5/2009 | Hamel et al. | |
| 2009/0195407 A1* | 8/2009 | Nakano et al. | 340/825.69 |

* cited by examiner

APPARATUS, SYSTEMS AND METHODS FOR PAIRING A CONTROLLED DEVICE WITH AN RF REMOTE CONTROL USING AN RFID TAG

PRIORITY CLAIM

This patent application is a Continuation of U.S. Non-Provisional patent application Ser. No. 13/071,773, filed Mar. 25, 2011, published as U.S. Publication No. 2012/0242455, entitled "APPARATUS, SYSTEMS AND METHODS FOR PAIRING A CONTROLLED DEVICE WITH AN RF REMOTE CONTROL USING AN RFID TAG," and issued as U.S. Pat. No. 8,525,651 on Sep. 3, 2013, the content of which is herein incorporated by reference in its entirety.

BACKGROUND

Media devices, such as a set top box, a stereo, a television, a computer system, a game system, or the like, are often configured to receive operating instructions from a user via a remote control. When the remote control communicates user instructions to the media device using an infrared (IR) signal, the remote control must be within a line-of-sight range of the controlled media device so that the emitted IR signal is detectable by the controlled media device.

Recent advances in technology have resulted in remote controls that are configured to emit a radio frequency (RF) signal that is detectable by the controlled media device. Such RF remote controls no longer need to be within the line-of-sight range of the controlled media device, and thus provide the advantage of a wider area of delectability. For example, the user may adjust volume or change a channel from the next room using the RF remote control.

However, the emitted RF signal from the RF remote control may be detectable by a plurality of different controlled media devices in different locations. Unintentional detection of the emitted RF signal by other media devices may not be desirable.

For example, a set top box and a television are examples of controlled media devices that might be configured to receive and operate in accordance with an RF signal emitted by a particular RF remote control. However, since the strength of the emitted RF signal may be relatively great, the neighbor's set top box and/or television may detect the emitted RF signal, and accordingly, operate in accordance with the detected RF signal in an unintended manner (at least from the perspective of the neighbor).

As another example, the user may have a second set top box or television in another part of their residence. Another family member may be watching a TV program on the television in the other part of the residence. The set top box and/or television in the other part of the residence may detect the emitted RF signal, and accordingly, operate upon the detected RF signal in an unintended manner (at least from the perspective of the other family member).

To solve the issue where some media devices may unintentionally operate in accordance with detected RF signals emitted from an RF remote control, a pairing scheme is used to configure the media device to operate in accordance with a detected RF signal emitted from a "paired" RF remote control, and not operate in accordance with detected RF signals emitted from other "unpaired" RF remote controls. Such pairing schemes pair a particular RF remote control with a single media device, such as a set top box. Additionally, the particular RF remote control may be paired with other media devices, such as a television or other controlled media content presentation device located in the same media room. Also, a plurality of RF remote controls may be paired with one or more controlled media devices.

Pairing between an RF remote control and a controlled media device is accomplished by initially configuring the controlled media device to recognize a unique identifier (ID) associated with the RF remote control. For example, a MAC address or the like of the RF remote control may be used to uniquely identify the RF remote control. Emitted RF signals include the unique ID of the RF remote control. When an RF signal is detected by the controlled media device, the controlled media device checks the ID included in the detected RF signal with the previously stored unique ID associated with its paired RF remote control. If the two identifiers match, then the controlled media device will operate in accordance with the detected RF signal. On the other hand, if the ID included in the detected RF signal does not match with the previously stored unique ID associated with its paired RF remote control, then the controlled media device will ignore or otherwise disregard the detected RF signal.

Before a particular RF remote control may be used to control one or more media devices, the RF remote control must be initially paired with the controlled media device. The pairing process is typically a manually-performed process whereby the user must locate the RF remote control in proximity to the intended controlled media device, and then manually initiate the pairing process. Often, menus or other suitable graphical interfaces are provided to assist the user in successfully initiating and completing the pairing process. Once the pairing process is completed, the controlled media device will operate in accordance with detected RF signals emitted by its paired RF remote control, and not operate in accordance with detected RF signals emitted by other remote controls.

The pairing process is often rather complex and may be difficult for the user to successfully complete. If the user makes a mistake in the pairing process, the pairing process may have to be manually reinitiated. In such situations, the user may become frustrated. Accordingly, there is a need in the arts to simplify the pairing process between a controlled media device and its paired RF remote control.

SUMMARY

Systems and methods of initiating one of a pairing process and a de-pairing process between a controlled device and a radio frequency (RF) remote control are disclosed. An exemplary embodiment detects presence of a radio frequency identifier (RFID) tag in an interrogation zone established by an RFID tag reader, automatically initiates a pairing process in response to detecting the presence of the RFID tag in the interrogation zone, and completes the pairing process between the RF remote control and the controlled device, wherein the pairing process identifies a unique identifier associated with the RF remote control. A subsequently received RF signal emitted by the RF remote control includes at least one command configured to control operation of the controlled device and includes the unique identifier.

BRIEF DESCRIPTION OF THE DRAWINGS

Preferred and alternative embodiments are described in detail below with reference to the following drawings.

DETAILED DESCRIPTION

Figure 1:
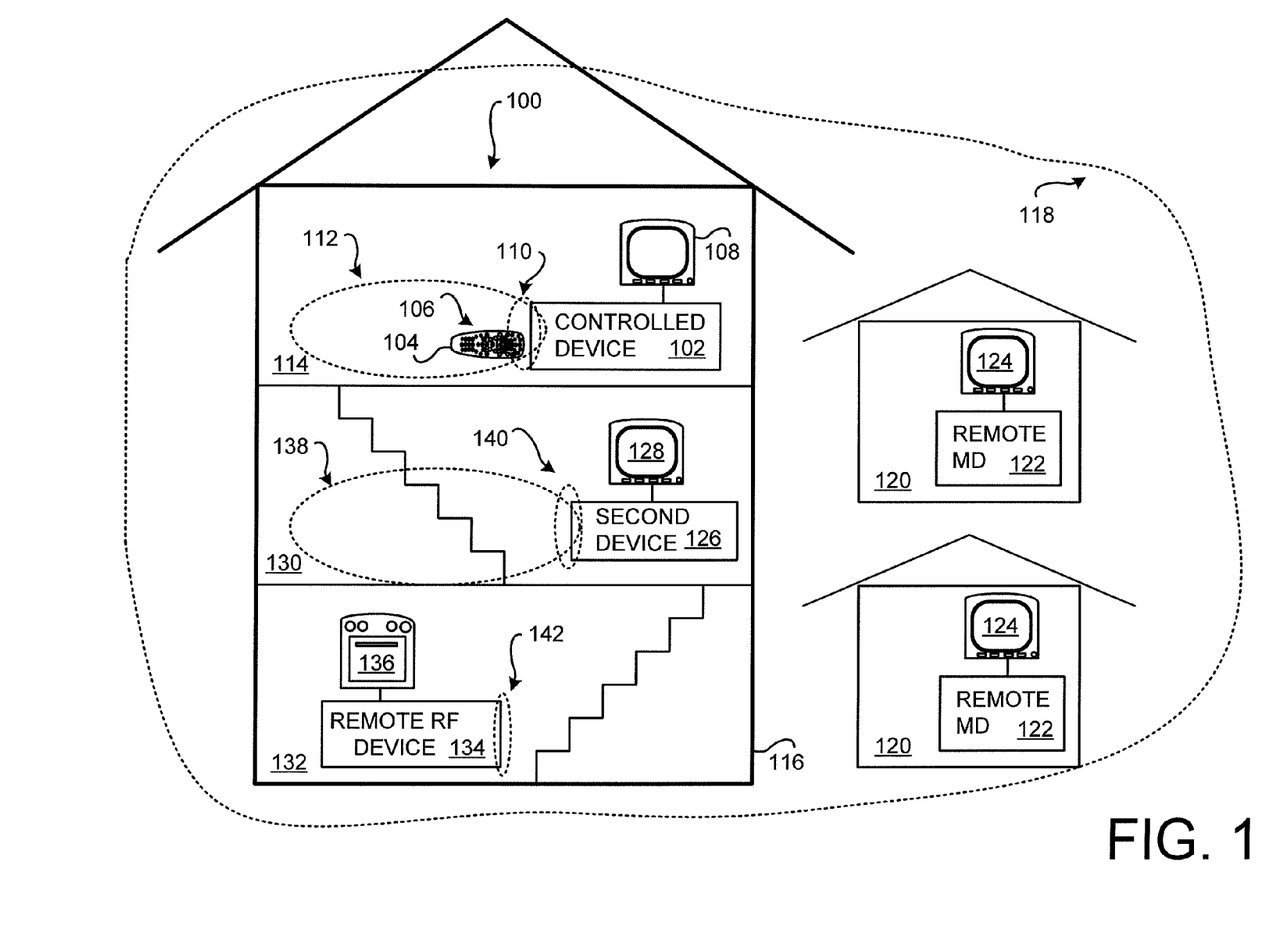
FIG. 1 is a block diagram of an embodiment of radio frequency identifier (RFID) pairing system comprising a controlled device and a radio frequency (RF) remote control with an RFID tag.

FIG. 1 is a block diagram of an embodiment of radio frequency identifier (RFID) pairing system 100 comprising a controlled device 102 and a radio frequency (RF) remote control 104 with an RFID tag 106. The RFID pairing system 100 facilitates pairing between the controlled device 102 and the RF remote control 104. Embodiments of the RFID pairing system may be implemented in any electronic-based device that is configured to receive communications from the RF remote control 104. Once the pairing process is completed, the controlled device 102 will act on detected RF signals emitted by its paired RF remote control 104, and not operate in accordance with commands in detected RF signals emitted by other RF remote controls.

An exemplary embodiment of the RFID pairing system 100 is configured to detect presence of the RFID tag 106 in an interrogation zone. In response to detecting the presence of the RFID tag 106, embodiments are configured to automatically initiate the pairing process between the controlled device 102 and the RF remote control 104.

Depending upon the embodiments, the pairing process may be implemented in a variety of manners. During an exemplary pairing process, an identity of the controlled device 102 and an identity of the RF remote control 104 are associated with each other. In an exemplary embodiment, a unique identifier associated with the RF remote control 104, such as its MAC address, serial number, user specified identifier, or the like, permits the controlled device 102 to recognize and to operate in accordance with commands in any detected RF signals emitted by the RF remote control 104. In another embodiment, the unique identifier of the controlled device 102 is provided to the RF remote control 104 so that RF signals emitted by the RF remote control 104 may include the unique identifier of the controlled device 102. In some embodiments, a unique identifier is defined during each pairing process, such as a short address or the like. Since both the controlled device 102 and the RF remote control 104 have the defined unique identifier, the RF signals emitted by the RF remote control 104 will include the defined unique identifier so that the controlled device 102 will recognize and operate in accordance with commands in any detected RF signals emitted by the RF remote control 104. Any suitable pairing scheme may be used by the various embodiments.

In the various embodiments, the interrogation zone 110 corresponds to a relatively short distance, or range, between the controlled device 102 and the RF remote control 104. The interrogation zone 110 is established by a component of the controlled device 102.

By way of example, the controlled device 102 is described as a media device that is configured to provide media content to a media content presentation device 128, such as a television or the like. In some embodiments, the media content presentation device 108 may be similarly paired with the RF remote control 104 during another pairing process. Alternatively, or additionally, the controlled device 102 may manage the pairing between the media content presentation device 108 and the RF remote control 104.

After completion of the pairing process, when the user is in an intended operating range 112 that encompasses a particular room 114 of the customer premises 116, detected RF signals emitted by the RF remote control 104 will be acted upon by the controlled device 102 and/or the media content presentation device 108. The operating range 112 corresponds to a range or distance between the controlled device 102 and the RF remote control 104 for which the user may intend to operate the controlled device 102 and/or the associated media content presentation device 108.

The RF remote control 104 is configured to emit RF signals that are detectable across a relatively long maximum detection range 118 that encompasses the customer premises 116, such as their residence, business, or the like. The maximum detection range 118 may extend beyond the customer premises 116, and may extend to one or more other customer premises 120. Since the RF signals emitted by the RF remote control 104 are detectable by other electronic devices within the maximum detection range 118, it is very undesirable for these other electronic devices to operate in accordance with commands in detected RF signals emitted by the RF remote control 104. Since the exemplary RF remote control 104 has not been paired with these other electronic devices, they will not operate in accordance with commands in any detected RF signals emitted by the RF remote control 104.

For example, the remote media devices 122 and/or their respective controlled media content presentation devices 124 located in the other residences 120 are not paired with the RF remote control 104. Accordingly, the remote media devices 122 and/or the media content presentation devices 124 will not operate in accordance with commands in detected RF signals emitted by the RF remote control 104.

Similarly, within the customer premises 116, an exemplary second media device 126 and/or another controlled media content presentation device 128 may be located in another room 130 of the customer premises 116. The exemplary second media device 126 and/or the media content presentation device 128 will not operate in accordance with commands in detected RF signals emitted by the RF remote control 104 since these devices 126, 128 are not currently paired with the RF remote control 104.

At times, the user may wish to use the RF remote control 104 to control the second media device 126 and/or the media content presentation device 128. For example, when the user is in an intended operating range of the second media device 126 and/or the media content presentation device 128, as conceptually illustrated by the control range 138 that encompasses the room 130 of the customer premises 116, detected RF signals emitted by the RF remote control 104 should be acted upon by the second media device 126 and/or the media content presentation device 128. However, before the second media device 126 and/or the media content presentation device 128 may operate in accordance with commands in any detected RF signals, the second media device 126 must be paired with the RF remote control 104. Further, the media content presentation device 128 may also be paired with the RF remote control 104 if the media content presentation device 128 is to be controlled by the RF remote control 104.

The exemplary embodiment of the RFID pairing system 100 is configured to automatically initiate the pairing process between the RF remote control 104 and the second media device 126 in response to locating the RF remote control 104 within the interrogation zone 140, which corresponds to the detection range of the RFID tag 106 by the second media device 126. The media content presentation device 128 may be similarly paired with the RF remote control 104 during another pairing process. Alternatively, or additionally, the second media device 126 may manage the pairing between the media content presentation device 128 and the RF remote control 104. Thus, when the user is in an intended control range 138 that encompasses the room 130, detected RF signals emitted by the RF remote control 104 will be acted upon by the controlled second media device 126 and/or the media content presentation device 128.

However, unless the controlled device 102 and/or the media content presentation device 108 have been de-paired from the RF remote control 104, they may also detect and act in accordance with any RF signals emitted from the RF remote control 104 when the user is using the RF remote control 104 in the room 130, and is intending to operate the second media device 126 and/or the second media content presentation device 128. In this situation, the controlled device 102 and/or the media content presentation device 108 will continue to respond to detected RF signals emitted by the RF remote control 104, even though such RF signals are intended only to operate the second media device 126 and/or the media content presentation device 128. To prevent such unintended operation of the controlled device 102 and/or the media content presentation device 108, the controlled device 102 and/or the media content presentation device 108 must be de-paired from the RF remote control 104.

To initiate the de-pairing process, preferably before the user leaves the room 114 with the RF remote control 104, the user moves the RF remote control 104 into the interrogation zone 110. Upon sensing the RFID tag 106, the controlled device 102 automatically initiates the de-pairing process. The user may also similarly automatically initiate a de-pairing process with the media content presentation device 108, or alternatively, the controlled device 102 may initiate the de-pairing process with the media content presentation device 108. Once the de-pairing process has been completed, the controlled device 102 and the media content presentation device 108 will not operate in accordance with commands in any detected RF signals subsequently emitted by the RF remote control 104.

Depending upon the embodiments, the de-pairing process may be implemented in a variety of manners. In an exemplary embodiment, the unique identifier of the RF remote control 104 is not recognized by the controlled device 102, and the controlled device 102 is reconfigured to not act on any detected RF wireless signals 242. In another embodiment, the RF remote control 104 omits the unique identifier of the controlled device 102 in the subsequently emitted RF wireless signals 242. Accordingly, the controlled device 102 will not recognize any detected RF wireless signals 242. In yet another embodiment, a subsequent pairing process defines a new unique identifier such that the previously used unique identifier is no longer included in any emitted RF wireless signals 242. Any suitable de-pairing scheme may be used by the various embodiments.

In some situations, such as within another room 132 of the customer premises 116, one or more remote RF devices 130 may be located and configured to control operation of one or more appliances 132. An exemplary appliance 132 is the illustrated oven. For example, the user may turn on, turn off, or adjust temperature of the exemplary oven in accordance with RF signals received by the remote RF device 134. Other non-limiting examples of a controllable appliance includes a refrigerator, a security system, one or more lights, or the like.

Assuming that the remote RF device 134 is not currently paired with the RF remote control 104, the remote RF device 134 will not act to control operation of the appliance 136 in the event that the remote RF device 134 detects RF signals emitted by the RF remote control 104. At times, the user may wish to use the RF remote control 104 to control operation of the appliance 136 using the RF remote control 104. Since the remote RF device 134 is within the maximum detection range 118 of the RF signals emitted by the RF remote control 104, the remote RF device 134 will operate in accordance with commands in such detected RF signals emitted by the RF remote control 104 when paired with the RF remote control 104.

The exemplary embodiment of the RFID pairing system 100 is configured to automatically initiate the pairing process between the RF remote control 104 and the remote RF device 134 in response to the user locating the RF remote control 104 in a interrogation zone 142, which corresponds to the detection range of the RFID tag 106 by the remote RF device 134. At other times, the user may similarly initiate a de-pairing process between the RF remote control 104 and the remote RF device 134 by subsequently moving the RF remote control 104 into the interrogation zone 142.

In the various embodiments, the range or distance encompassed by the interrogation zones 110, 140 and 142 depends upon the characteristics of the RF tag 106 and upon the components of the controlled device 102, the second media device 126, and the remote RF device 134, respectively. In some embodiments, the interrogation zones 110, 140, and 142 may be the same. However, the interrogation zones 110, 140, and/or 142 may be different. In the various embodiments, the interrogation zones 110, 140, and 142 are preferably of a relatively small size so that the pairing process and/or de-pairing process may be intentionally initiated by the user.

If the interrogation zones 110, 140, and/or 142 are too large, then a pairing process and/or de-pairing process may be unintentionally initiated. In an exemplary embodiment, the interrogation zones 110, 140, and/or 142 are sufficiently small so as to require physical contact between the RF remote control 104 and the controlled device 102, the second media device 126, and/or the remote RF device 134. In some embodiments, a predefined location on the controlled device 102, the second media device 126, and/or the remote RF device 134 may be used. The predefined location may be visibly marked on the surface of the controlled device 102, the second media device 126, and/or the remote RF device 134 so that the user knows precisely where the RF remote control 104 must be placed to automatically initiate the pairing process and/or de-pairing process.

In other embodiments, the range of the interrogation zones 110, 140, and/or 142 may be relatively large, such as a few inches, a few feet, or even spanning the area of a media room or the customer premises 116. In an exemplary embodiment, the range of the interrogation zones 110, 140, and/or 142 are adjustable. For example a physical controller such as a dial or the like may be used to adjust the range of one or more of the interrogation presented to the user and receive input for a user selection of the range. Any suitable range of the interrogation zones 110, 140, and/or 142 may be used in the various embodiments.

Figure 2:
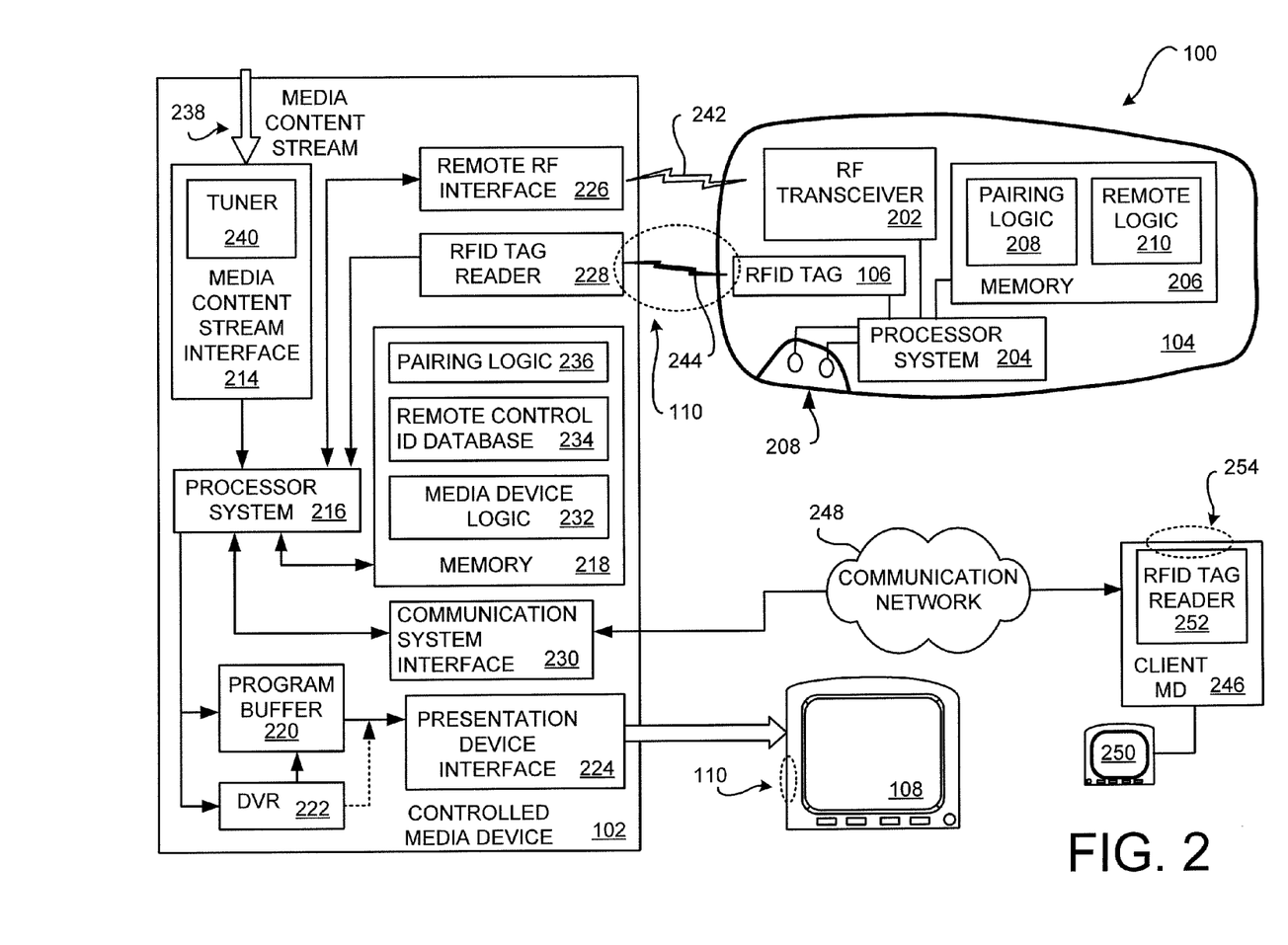
FIG. 2 is a block diagram of an embodiment of the RFID pairing system implemented in an exemplary RF remote control and an exemplary controlled media device.

FIG. 2 is a block diagram of an embodiment of the RFID pairing system 100 implemented in an exemplary RF remote control 104 and an exemplary controlled device 102. The exemplary RF remote control 104 comprises the RFID tag 106, an RF transceiver 202, a processor system 204, a memory 206, and a plurality of controllers 208 residing on a surface of the RF remote control 104. The memory 206 comprises portions for storing the remote logic 210 and the optional pairing logic 212. In some embodiments, the remote logic 210 and the pairing logic 212 may be integrated together, and/or may be integrated with other logic. Other RF remote controls may include some, or may omit some, of the above-described media processing components. Further, additional components not described herein may be included in alternative embodiments The non-limiting exemplary controlled device 102 is a media device, hereinafter referred to as the controlled device 102. A non-limiting example of the controlled device 102 is a set top box (STB) configured to receive media content, which is communicated to a media content presentation device 108 for presentation. Embodiments of the RFID pairing system 100 may be implemented in other media devices, such as, but not limited to, stereos, surround-sound receivers, radios, televisions (TVs), digital video disc (DVD) players, digital video recorders (DVRs), game playing devices, or personal computers (PCs) that are configured to receive communications from an RF remote control 104.

The exemplary controlled device 102 comprises a media content stream interface 214, a processor system 216, a memory 218, a program buffer 220, an optional digital video recorder (DVR) 222, a presentation device interface 224, a remote RF interface 226, an RFID tag reader 228, and communication system interface 230. The memory 218 comprises portions for storing the media device logic 232, remote control identifier (ID) database 234, and the pairing logic 236. In some embodiments, the media device logic 232 and the pairing logic 236 may be integrated together, and/or may be integrated with other logic. In other embodiments, some or all of these memory and other data manipulation functions may be provided by and using remote server or other electronic devices suitably connected via the Internet or otherwise to a client device. Other media devices may include some, or may omit some, of the above-described media processing components. Further, additional components not described herein may be included in alternative embodiments.

The functionality of the controlled device 102, here a set top box, is now broadly described. A media content provider provides program content that is received in one or more multiple media content streams 238 multiplexed together in one or more transport channels. The transport channels with the media content streams 238 are communicated to the controlled device 102 from a media system sourced from a remote head end facility (not shown) operated by the media content provider. Non-limiting examples of such media systems include satellite systems, cable system, and the Internet. For example, if the media content provider provides programming via a satellite-based communication system, the controlled device 102 is configured to receive one or more broadcasted satellite signals detected by an antenna (not shown). Alternatively, or additionally, the media content stream 238 can be received from one or more different sources, such as, but not limited to, a cable system, a radio frequency (RF) communication system, or the Internet.

The one or more media content streams 238 are received by the media content stream interface 214. One or more tuners 240 in the media content stream interface 214 selectively tune to one of the media content streams 238 in accordance with instructions received from the processor system 216. The processor system 216, executing the media device logic 232 and based upon a request for a media content event of interest specified by the user, parses out media content associated with a media content event of interest. The media content event of interest is then assembled into a stream of video and/or audio information which may be stored by the program buffer 220 such that the media content event can be streamed out to the media content presentation device 108 via the presentation device interface 224. Alternatively, or additionally, the parsed out program content may be saved into the DVR 222 for later presentation. The DVR 222 may be directly provided in, locally connected to, or remotely connected to, the controlled device 102. In alternative embodiments, the media content streams 238 may stored for later decompression, processing and/or decryption.

The exemplary controlled device 102 is configured to receive (detect) commands from a user via the RF remote control 104. The RF remote control 104 includes a plurality of controllers 208 on its surface, such as the exemplary controllers 208. The user, by actuating one or more of the controllers 208, causes the RF remote control 104 to generate and transmit commands, via an RF wireless signal 242, to the controlled device 102. If the detected RF wireless signal 242 includes identifier information that indicates that the RF remote control 104 has been paired with the controlled device 102, the commands control the controlled device 102 and/or may control the media content presentation device 108.

The above processes performed by the controlled device 102 are generally implemented by the processor system 216 while executing the media device logic 232. Thus, the controlled device 102 may perform a variety of functions related to the processing of the media content stream 238 and processing operating instructions received from a paired RF remote control 104.

Embodiments of the RFID pairing system 100 are configured to automatically initiate the pairing process between the controlled device 102 and the RF remote control 104 in response to the user placing (locating) the RF remote control 104 within the interrogation zone 110. The interrogation zone 110 corresponds to a relatively short distance, or range, between the controlled device 102 and the RF remote control 104 wherein the RFID tag reader 228 is configured to detect the RFID tag 106 residing in or affixed to in the RF remote control 104. The effective distance associated with the interrogation zone 110 of the RFID tag reader 228 may be designed to any desirable distance based on the characteristics of the RFID tag 106 and the RFID tag reader 228.

The RFID tag 106 is configured to communicate information in an information signal 244 that is detectable by the RFID tag reader 228. In an exemplary embodiment, the information signal 244 includes information that uniquely identifies the RF remote control 104 to the detecting controlled device 102. The unique identifier of the RF remote control 104 may be any suitable identifier, such as a media access control (MAC) address or any other suitable identifier of the RF remote control 104. Alternatively, the unique identifier may be an identifier of the RFID tag 106. In some embodiments, the user may define the unique identifier using one or more of the controllers 208 of the RF remote control 104 and/or by navigating about a graphical user interface that is presented on the media content presentation device 108 or another display.

Any suitable type of emitting device may be used, referred to herein generically as the RFID tag 106, in the various embodiments. In an exemplary embodiment, the RFID tag 106 is a passive device configured to initiate the identification information signal 244 based on proximity to an external magnetic field that is established by the RFID tag reader 228. The electromagnetic energy received by the passive RFID tag 106 results in a modulation of the magnetic field as the RFID tag 106 is energized. The modulated magnetic field is detectable by the RFID tag reader 228. The modulated magnetic field (i.e.; the information signal 244 with the unique identifier information) is detectable by the RFID tag reader 228.

In another exemplary embodiment, the RFID tag 106 is an active device that emits the wireless information signal 244 when in proximity to the RFID tag reader 228. A power source (not shown) in the RF remote control 104 provides power to the active RFID tag 106 for generation of the emitted wireless information signal 244.

In some embodiments, the RFID tag 106 is an integrated component of the RF remote control 104. In other embodiments, the RFID tag 106 may be a separate device that is affixed to the RF remote control 104 or later placed into the RF remote control 104. A separate RFID tag 106 that may be affixed to or placed in an existing RF remote control 104 may provide for the integration of a legacy RF remote control 104 into an embodiment of the RFID pairing system 100.

In the various embodiments, detection of the RFID tag 106 in the interrogation zone 110 automatically initiates the pairing process between the controlled device 102 and the RF remote control 104. The processor system 216, executing the pairing logic 236, receives the RF remote control identifier associated with that particular RF remote control 104, and then stores the received RF remote control identifier into the remote control ID database 234. Any suitable pairing algorithm, method, or process that is configured to pair the controlled device 102 and the RF remote control 104 may be used by the various embodiments for the pairing process that is initiated by the user placing the RF remote control 104, and more particularly the RFID tag 106, into the interrogation zone 110 that is established by the RFID tag reader 228. In some embodiments, if the received RF remote control identifier is already saved into the remote control ID database 234 from a prior pairing, the pairing process is not automatically initiated.

After the pairing process is completed, the controlled device 102 will operate in accordance with commands in detected RF wireless signal 242 subsequently emitted by the RF remote control 104, and not operate in accordance with commands in detected RF signals emitted by other RF remote controls. When an RF wireless signal 242 is detected by the remote RF interface 226 of the controlled device 102, the processor system 216, executing the pairing logic 236, compares the identifier in the detected RF wireless signal 242 with the RF remote control identifiers stored in the remote control ID database 234. If the identifier in the RF wireless signal 242 corresponds to one of the stored RF remote control identifiers, the operating instructions in the received RF wireless signal 242 may be acted on to control operation of the controlled device 102 and/or to control the media content presentation device 108.

Embodiments of the RFID pairing system 100 may be similarly implemented in other electronic devices, such as the exemplary media content presentation device 108 and/or the exemplary remote RF device 134, that are configured to receive the RF wireless signal 242 emitted by the RF remote control 104. Such electronic devices would be similarly configured as the above-described controlled device 102. When the user places the RF remote control 104 into the interrogation zone of the RFID tag reader of the electronic device, the pairing process between the RF remote control 104 and the electronic device may be automatically initiated. The unique identifier associated with the RF remote control 104 is stored as the RF remote control identifier by the pairing electronic device. Accordingly, subsequently received RF wireless signals 242 emitted by the RF remote control 104 may then be acted on by the paired electronic device.

At various times, the user may not want the controlled device 102 and/or the media content presentation device 108 to operate in accordance with commands in the RF wireless signal 242 emitted by the paired RF remote control 104, such as when the user takes the RF remote control 104 into another room where there are other electronic devices that are configured to be controlled by the RF remote control 104. To prevent any currently paired electronic devices from unintentionally operating on any future RF wireless signal 242 emitted by the paired RF remote control 104, a de-pairing process is performed wherein the RF remote control 104 is de-paired from the controlled device 102, the media content presentation device 108 and/or another paired controlled electronic device. Once the de-pairing process is completed, subsequently received RF wireless signals 242 emitted by the RF remote control 104 will not be acted on by the controlled device 102, the media content presentation device 108 and/or the other electronic device.

In the various embodiments, the de-pairing process is automatically initiated by the detection of the RFID tag 106 in the interrogation zone 110. The RFID tag reader 228 senses the proximity of the RF remote control 104, and more particularly, the proximity of the RFID tag 106, when the user places the RF remote control 104 within the interrogation zone 110 of the RFID tag reader 228. The RFID tag reader 228 communicates information corresponding to the unique identifier associated with the RF remote control 104 to the processor system 216.

The processor system 216, executing the pairing logic 236, receives the information that includes the RF remote control identifier associated with that particular RF remote control 104. If the RF remote control identifier, or other associated information, already resides in the remote control ID database 234, the de-pairing process is initiated. That is, since the RF remote control 104 is already actively paired with the controlled device 102, the unique identifier has already been stored into the remote control ID database 234. Presence of the unique identifier of the RF remote control 104 in the remote control ID database 234 indicates that the RF remote control 104 is currently paired with the controlled device 102.

Any suitable de-pairing algorithm, method, or process that is configured to de-pair the controlled device 102 and the RF remote control 104 may be used by the various embodiments. In an exemplary embodiment, the RF remote control identifier may be erased, deleted or otherwise removed from the remote control ID database 234 to effect the de-pairing process. In another embodiment, the RF remote control identifier is retained in the remote control ID database 234, but is flagged or otherwise identified so that the RF remote control 104 is effectively unpaired from the controlled device 102. The de-pairing process may be similarly initiated in the media content presentation device 108 and/or the other electronic devices.

At a later time, the user may wish to re-pair the RF remote control 104 with the controlled device 102, the media content presentation device 108 and/or the other electronic devices to control their operation with the RF remote control 104. The pairing process can be automatically initiated by placing the RF remote control 104, and more particularly the RFID tag 106, into the interrogation zone 110 of the particular controlled device 102, media content presentation device 108 and/or other electronic device that the user wishes to control with the RF remote control 104.

Some embodiments of the RFID pairing system 100 may be configured to permit a plurality of different RF remote controls 104 to be concurrently paired with a single controlled device 102, media content presentation device 108 and/or other electronic device. For example, the media content presentation device 108 may have been provided with an original equipment manufacturer (OEM) RF remote control 104. A second OEM RF remote control 104 that was provided with the controlled device 102 may also be configurable to operate the media content presentation device 108. Additionally, or alternatively, a universal type RF remote control 104 may be configurable to operate the media content presentation device 108 and/or the controlled device 102. All of these different RF remote controls 104 may be concurrently paired with the controlled device 102 and/or the media content presentation device 108 such that they will operate in accordance with commands in the received RF wireless signals 242 emitted by any of the paired RF remote controls 104.

Some RFID pairing systems 100 are configured to automatically initiate pairing processes and/or de-pairing processes with other remote devices, such as the exemplary client media device (MD) 246. The controlled device 102 may be communicatively coupled to the client media device 246 via a communication network 248, via the communication system interface 230. For example, the communication network may be a local area network (LAN), power line carrier system, or the like located in the customer premises 116 (FIG. 1). The client media device 246 may be controlling operations of the exemplary media content presentation device 250. In an exemplary situation, a plurality of media content presentation devices 108 may be used to view the same media content event, such as a football game, news report, movie, or the like. Accordingly, a single RF remote control 104 may be paired with a plurality of electronic devices such that the electronic devices are all concurrently operated in accordance with the received RF wireless signals 242 emitted by the RF remote control 104. Such an embodiment may be desirable when the customer premises 116 corresponds to a business, such as a bar, a restaurant, or the like, where the plurality of media content presentation devices 108 and/or client media devices 246 are available for viewing by the patrons.

Further, the client media device 246 may include its own RFID tag reader 252 such that pairing or de-pairing between the RF remote control 104 and the client media device 246 and/or the media content presentation device 250 can be automatically initiated by placing the RF remote control 104 in the interrogation zone 254 of the client media device 246. Additionally, or alternatively, the client media device 246 may support pairing and/or de-pairing process between the RF remote control 104 and other electronic devices, such as the controlled device 102.

The various embodiments of the RFID pairing system 100 automatically initiate the pairing and/or de-pairing processes when the RFID tag 106 of the RF remote control 104 is placed within an interrogation zone established by an RFID tag reader of an electronic device. The degree of automation of the pairing and/or de-pairing processes may vary depending upon the embodiments. In an exemplary embodiment, the pairing and/or de-pairing processes is completed automatically based on the unique identifier provided by the RF remote control 104. In one embodiment, the unique identifier is included in the information signal 244 from the RFID tag 106. In another embodiment, once the pairing and/or de-pairing processes is automatically initiated, the RF remote control 104 provides the identification information for completing the pairing and/or de-pairing processes in an RF wireless signal 242 emitted by the RF transceiver 202 of the RF remote control 104.

Further, the degree of interaction required of the user to complete the automatically initiated pairing and/or de-pairing processes may vary between the embodiments. In an exemplary embodiment, the user need only place the RF remote control 104 in the interrogation zone of the electronic device that is to be paired or de-paired. The embodiment automatically completes the pairing and/or de-pairing processes without further user involvement. Another embodiment receives a user confirmation corresponding to an intent to complete the pairing and/or de-pairing processes before such processes proceed to completion. For example, the user may be required to actuate one or more of the controllers 208 on the RF remote control 104 to confirm the user's intent to pair or de-pair the RF remote control 104 and the electronic device.

In some embodiments, the pairing and/or de-pairing processes may be relatively complex and require various user inputs. For example, a graphical user interface (GUI) may be presented on the media content presentation device 108 when the controlled device 102 is paired or de-paired with the RF remote control 104. The user may be required to navigate about the presented GUI so as to select among various options associated with the pairing and/or de-pairing processes by actuating the controllers 208.

Figure 3:
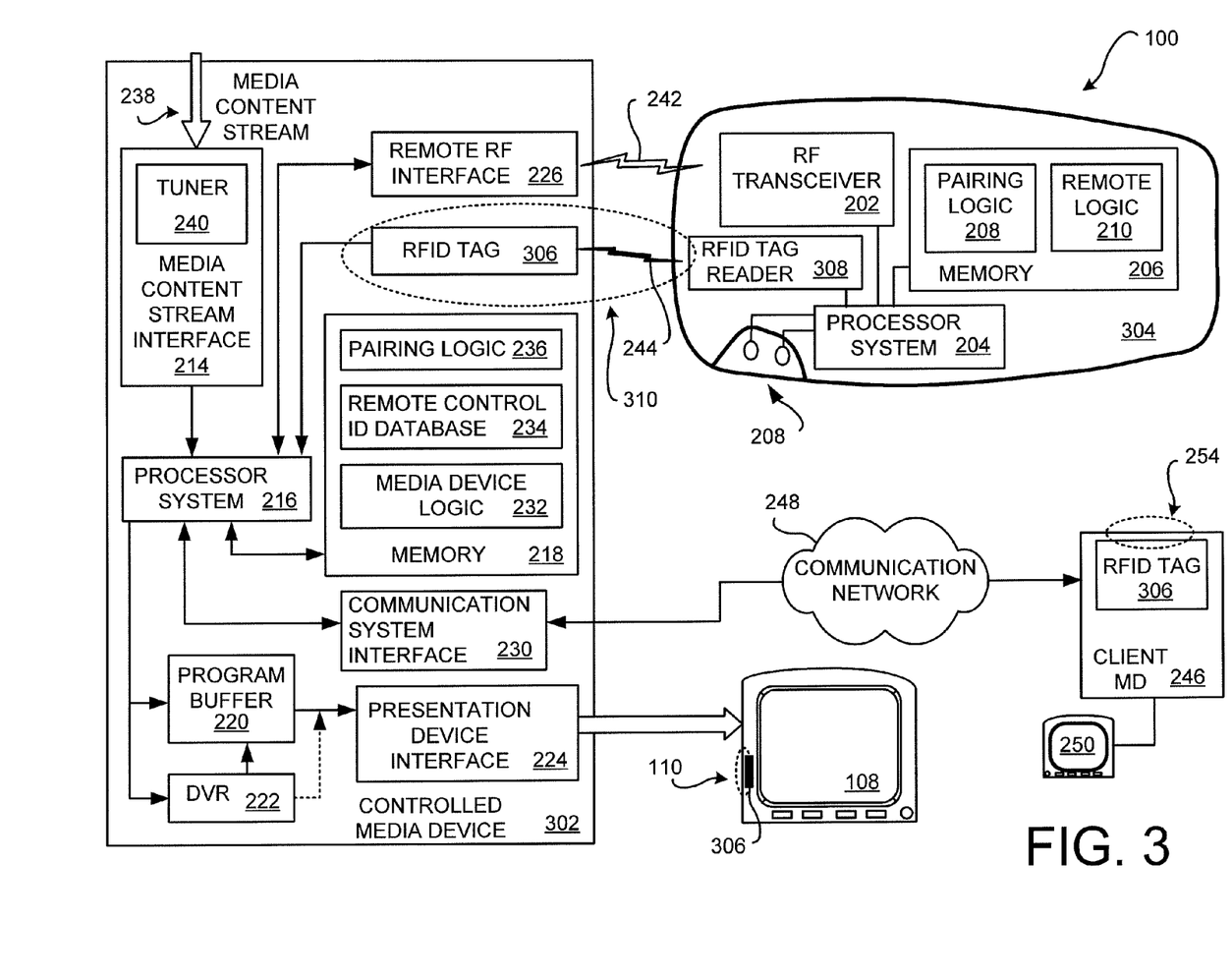
FIG. 3 is a block diagram of an embodiment of the RFID pairing system implemented in an alternative RF remote control and an alternative controlled media device.

FIG. 3 is a block diagram of an embodiment of the RFID pairing system implemented in an alternative controlled media device 302 and an alternative RF remote control 304. In the exemplary embodiment, the RFID tag 306 resides in or is affixed to the controlled media device 302. The RFID tag reader 308 resides in the RF remote control 304. The exemplary RFID tag 306 automatically initiates the pairing and/or de-pairing processes between the controlled media device 302 and the RF remote control 304.

Whenever the RF remote control 304 is placed in proximity to the controlled media device 302, such that the RFID tag 306 is in the interrogation zone 310 established by the RFID tag reader 308, the pairing and/or de-pairing processes is automatically initiated. In this exemplary embodiment, the RF remote control 304 may provide its unique identifier to the controlled media device 302 using any suitable means, such as in the information signal 244 or in the RF wireless signal 242. The pairing logic 208 may be used by the processor system 204 of the RF remote control 304 to support the pairing and/or de-pairing processes.

RFID tags 306 are relatively inexpensive. Accordingly, it may be more cost effective to include an RFID tag 306 in each of a plurality of different media devices, media content presentation devices, and/or remote RF devices that are located in the customer premises 116. Once the RFID tag reader 308 in the RF remote control 304 detects the presence of a particular one of the RFID tags 306, subsequent communications can be used to complete the automatically initiated pairing and/or de-pairing processes.

In some embodiments, the RFID tag 106 and/or RFID tag 306 do not include a unique identifier, such as the unique identifier of its particular electronic device. The RFID tags 106, 306 may be configured to provide sufficient information such that the pairing and/or de-pairing processes between the RF remote controls 104, 304 and the controlled electronic device is automatically initiated. Once the pairing and/or de-pairing processes are automatically initiated when the particular one of the RFID tags 106, 306 is within the interrogation zone, the RF remote control 104, 304 communicates with its respective electronic device as necessary to complete the automatically initiated pairing and/or de-pairing process.

It should be emphasized that the above-described embodiments of the RFID pairing system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for pairing radio frequency (RF) remote controls with controlled media devices, the method comprising:

detecting presence of a radio frequency identifier (RFID) tag of an RF remote control in a first interrogation zone established by a first RFID tag reader of a first controlled media device that is configured to receive a media content stream with a media content event of interest;
automatically initiating a first pairing process between the first controlled media device and the RF remote control in response to detecting presence of the RFID tag in the first interrogation zone, wherein upon completion of the first pairing process, the first controlled media device becomes paired with the RF remote control and becomes configured to operate in accordance with a subsequently received RF signal emitted by the RF remote control when the subsequently received RF signal is one of a first plurality of RF signals;
detecting presence of the RFID tag in a second interrogation zone established by a second RFID tag reader of a second controlled media device that is operating at the same time as the first controlled media device, wherein the second controlled media device is configured to receive the media content event of interest from the first controlled media device and is configured to present video information of the media content event of interest to a user on a display of the second controlled media device; and
automatically initiating a second pairing process in response to detecting the presence of the RFID tag in the second interrogation zone, wherein upon completion of the second pairing process, the second controlled media device becomes paired with the RF remote control and becomes configured to operate in accordance with the subsequently received RF signal emitted by the RF remote control when the subsequently received RF signal is one of a second plurality of RF signals, wherein the second plurality of RF signals are different from the first plurality of RF signals,
wherein during concurrent operation of the first controlled media device and the second controlled media device, while the first controlled media device and the second controlled media device are concurrently paired with the RF remote control, the subsequently received RF signal emitted by the RF remote control is detected by the first controlled media device and the second controlled media device,
wherein the first controlled media device operates in response to the subsequently received RF signal when the subsequently received RF signal emitted by the RF remote control is one of the first plurality of RF signals, and
wherein the second controlled media device operates in response to the subsequently received RF signal emitted by the RF remote control when the subsequently received RF signal is one of the second plurality of RF signals.

2. The method of claim 1, further comprising:
receiving, at the first controlled media device, a unique identifier associated with the RF remote control after detecting the presence of the RFID tag in the first interrogation zone established by the first RFID tag reader;
storing, at the first controlled media device, the unique identifier associated with the RF remote control, wherein the first controlled media device operates in response to the subsequently received RF signal emitted by the RF remote control only when the unique identifier associated with the RF remote control is included in the subsequently received RF signal;
receiving, at the second controlled media device, the unique identifier associated with the RF remote control after detecting the presence of the RFID tag in the second interrogation zone established by the second RFID tag reader, and
storing, at the second controlled media device, the unique identifier associated with the RF remote control, wherein the second controlled media device operates in response to the subsequently received RF signal emitted by the RF remote control only when the unique identifier associated with the RF remote control is included in the subsequently received RF signal.

3. The method of claim 1, wherein after the first controlled media device becomes configured to operate in accordance with at least one command in the subsequently received RF signal emitted by the RF remote control, and further comprising:
subsequently detecting the presence of the RFID tag in the first interrogation zone established by the first RFID tag reader;
automatically initiating a de-pairing process between the RF remote control and the first controlled media device; and
completing the de-pairing process between the RF remote control and the first controlled media device,
wherein the first controlled media device then becomes reconfigured to not operate in accordance with the subsequently received RF signal emitted by the RF remote control.

4. A method for pairing a radio frequency (RF) remote control with controlled devices, the method comprising:
detecting presence of a radio frequency identifier (RFID) tag of the RF remote control in a first interrogation zone established by a first RFID tag reader of a first controlled device that is configured to receive a media content stream with a media content event of interest;
pairing the RF remote control and the first controlled device, wherein the pairing is based on a unique identifier associated with the RF remote control that is identifiable by the first controlled device when operating;
detecting presence of the RFID tag of the RF remote control in a second interrogation zone established by a second RFID tag reader of a second controlled device, wherein the second controlled media device is configured to receive the media content event of interest from the first controlled media device and is configured to present video information of the media content event of interest to a user on a display of the second controlled media device; and
pairing the RF remote control and the second controlled device, wherein the pairing is based on the unique identifier associated with the RF remote control that is identifiable by the second controlled device when operating,
wherein the concurrently operating first controlled device and second controlled device are concurrently paired with the RF remote control,
wherein a subsequently received first RF signal emitted by the RF remote control that is received by both the concurrently operating first controlled device and second controlled device includes at least one first command configured to control operation of the first controlled device and includes the unique identifier, wherein the first controlled device responds to the at least one first command only when the unique identifier associated with the RF remote control is present in the subsequently received first RF signal, and
wherein a subsequently received second RF signal emitted by the RF remote control that is received by both the concurrently operating first controlled device and second controlled device includes at least one second command configured to control operation of the second controlled device and includes the unique identifier, wherein the second controlled device responds to the at least one second command only when the unique identifier associated with the RF remote control is present in the subsequently received second RF signal.

5. The method of claim 4, wherein detecting presence of the RFID tag in the first interrogation zone comprises:
   detecting the unique identifier associated with the RF remote control in a magnetic field modulated by the RFID tag.

6. The method of claim 4, wherein detecting presence of the RFID tag comprises:
   receiving the unique identifier associated with the RF remote control in an RF identification signal emitted by the RF remote control.

7. The method of claim 4, further comprising:
   storing the unique identifier associated with the RF remote control in a memory of the first controlled device during the detecting of the presence of the RFID tag in the first interrogation zone;
   retrieving the stored unique identifier associated with the RF remote control from the memory of the first controlled device in response to receiving the subsequently received first RF signal emitted by the RF remote control;
   comparing, at the first controlled device, the stored unique identifier associated with the RF remote control with an identifier in the received first RF signal, wherein the first controlled device responds to the at least one first command only when the unique identifier associated with the RF remote control matches the identifier in the received first RF signal;
   retrieving the stored unique identifier associated with the RF remote control from the memory of the second controlled device in response to receiving the subsequently received second RF signal emitted by the RF remote control;
   comparing, at the second controlled device, the stored unique identifier associated with the RF remote control with an identifier in the received first RF signal, wherein the second controlled device responds to the at least one second command only when the unique identifier associated with the RF remote control matches the identifier in the received first RF signal; and
   storing the unique identifier associated with the RF remote control in a memory of the second controlled device during the detecting of the presence of the RFID tag in the second interrogation zone.

8. The method of claim 4, wherein the RF remote control is a first RF remote control, wherein the RFID tag is a first RFID tag in the first RF remote control, wherein the unique identifier is a first unique identifier associated with the first RF remote control, and further comprising:
   detecting presence of a second RFID tag of a second RF remote control in the first interrogation zone established by the first RFID tag reader of the first controlled device;
   pairing the second RF remote control and the first controlled device, wherein the pairing is based on a second unique identifier associated with the second RF remote control that is identifiable by the second controlled device;
   detecting presence of the second RFID tag of the second RF remote control in the second interrogation zone established by the second RFID tag reader of the second controlled device; and
   pairing the second RF remote control and the second controlled device, wherein the pairing is based on the second unique identifier associated with the second RF remote control that is identifiable by the second controlled device,
   wherein a subsequently received third RF signal emitted by the second RF remote control includes at least one command configured to control operation of the first controlled device and includes the second unique identifier, and
   wherein a subsequently received fourth RF signal emitted by the second RF remote control includes at least one command configured to control operation of the second controlled device and includes the second unique identifier.

9. The method of claim 4, wherein the RF remote control is a first RF remote control, wherein the RFID tag is a first RFID tag in the first RF remote control, wherein the unique identifier is a first unique identifier associated with the first RF remote control, and further comprising:
   detecting presence of a second RFID tag of a second RF remote control in the first interrogation zone established by the first RFID tag reader of the first controlled device; and
   pairing the second RF remote control and the first controlled device, wherein the pairing is based on a second unique identifier associated with the second RF remote control that is identifiable by the second controlled device,
   wherein a subsequently received third RF signal emitted by the second RF remote control includes at least one command configured to control operation of the first controlled device and includes the second unique identifier, and
   wherein the subsequently received third RF signal emitted by the second RF remote control is disregarded by the second controlled device.

10. The method of claim 1, further comprising:
    receiving, at the RF remote control during the first pairing process, a first unique identifier that identifies the first controlled media device; and
    receiving, at the RF remote control during the second pairing process, a second unique identifier that identifies the second controlled media device,
    wherein at least one of the subsequently received RF signal includes the first unique identifier that identifies the at least one subsequently received RF signal as one of the first plurality of RF signals that controls the first controlled media device, and
    wherein at least one other of the subsequently received RF signal includes the second unique identifier that identifies the at least one other subsequently received RF signal as one of the second plurality of RF signals that controls the second controlled media device.

11. A method for pairing a radio frequency (RF) remote control with a controlled media device, the method comprising:
    detecting presence of a radio frequency identifier (RFID) tag in a first interrogation zone established by a first RFID tag reader that is a component of the controlled media device configured to receive broadcasted media content, wherein the RFID tag resides in or is affixed to the RF remote control configured to operate the controlled media device by communicating a first plurality of RF signals that are received by the controlled media device;

automatically initiating a pairing process between the controlled media device and the RF remote control in response to detecting a presence of the RFID tag in the first interrogation zone of the first RFID tag reader;

completing the pairing process between the RF remote control and the controlled media device, wherein the pairing process identifies a unique identifier associated with the RF remote control;

detecting presence of the RFID tag in a second interrogation zone established by a second RFID tag reader that is a component of a media content presentation device,
   wherein the component of the media content presentation device is configured to receive the broadcasted media content from the controlled media device,
   wherein the component of the media content presentation device is configured to present video information of the broadcasted media content received from the controlled media device to a user on a display of the second controlled media device,
   wherein the RF remote control is configured to operate the media content presentation device by communicating a second plurality of RF signals that are received by the media content presentation device, and
   wherein the second plurality of RF signals are different than the first plurality of RF signals;

automatically initiating a pairing process between the media content presentation device and the RF remote control in response to detecting a presence of the RFID tag in the second interrogation zone of the media content presentation device; and completing the pairing process between the RF remote control and the media content presentation device, wherein the pairing process identifies the unique identifier associated with the RF remote control, wherein during concurrent operation of the controlled media device and the media content presentation device to present the broadcasted media content, a subsequently received RF signal emitted by the RF remote control that is received by the controlled media device and the media content presentation device includes at least one command configured to control operation of the controlled media device or the media content presentation device, and includes the unique identifier of the RF remote control, wherein when the subsequently received RF signal is one of the first plurality of RF signals, the controlled media device is controlled, and wherein when the subsequently received RF signal is one of the second plurality of RF signals, the media content presentation device is controlled.

12. The method of claim 1,
wherein the first media content stream is a first media content stream,
wherein a third media device is configured to receive the media content event of interest in a second media content stream that is different from the first media content stream, wherein the third controlled media device is not paired with the RF remote control, and wherein the third controlled media device does not respond to any subsequently received RF signals emitted by the RF remote control.

13. The method of claim 1, wherein the RF remote control is a first RF remote control and the RFID tag is a first RFID tag, and further comprising:

detecting presence of a second RFID tag of a second RF remote control in the first interrogation zone established by the first RFID tag reader of a first controlled media device;

automatically initiating a third pairing process between the first controlled media device and the second RF remote control in response to detecting presence of the second RFID tag in the first interrogation zone, wherein upon completion of the third pairing process, the first controlled media device becomes paired with the second RF remote control and becomes configured to operate in accordance with a subsequently received RF signal emitted by the second RF remote control when the subsequently received RF signal is one of the first plurality of RF signals;

detecting presence of the second RFID tag in a second interrogation zone established by the second RFID tag reader of the second controlled media device that is operating at the same time as the first controlled media device; and automatically initiating a fourth pairing process in response to detecting the presence of the second RFID tag in the second interrogation zone, wherein upon completion of the fourth pairing process, the second controlled media device becomes paired with the second RF remote control and becomes configured to operate in accordance with the subsequently received RF signal emitted by the second RF remote control when the subsequently received RF signal is one of the second plurality of RF signals, wherein during concurrent operation of the first controlled media device and the second controlled media device, while the first controlled media device and the second controlled media device are concurrently paired with the RF remote control, RF signals emitted by the first RF remote control and the second RF remote control detected by the first controlled media device and the second controlled media device, wherein the first controlled media device operates in response to the subsequently received RF signal when the subsequently received RF signal emitted by the first RF remote control and the second RF remote control is one of the first plurality of RF signals, and wherein the second controlled media device operates in response to the subsequently received RF signal emitted by the first RF remote control and the second RF remote control when the subsequently received RF signal is one of the second plurality of RF signals.

* * * * *